Figure 1:
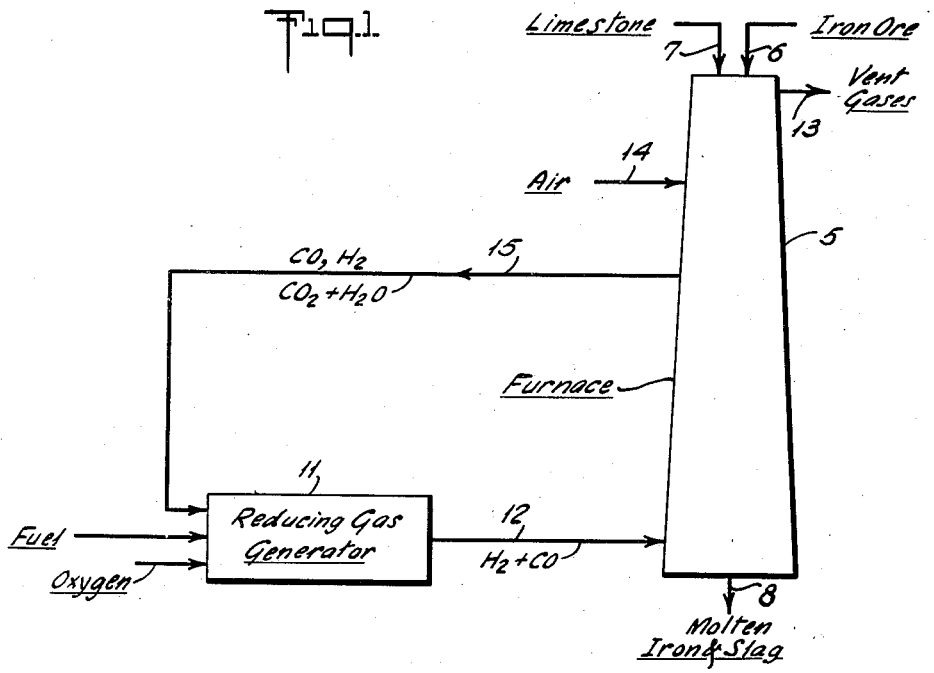

June 3, 1958  F. B. SELLERS ET AL  2,837,419
REDUCTION OF METAL OXIDES
Filed Feb. 15, 1957

2,837,419

REDUCTION OF METAL OXIDES

Frederick Burton Sellers, Tarrytown, N. Y., and Peter L. Pauli, Norwalk, Conn., assignors to Texaco Development Corporation, New York, N. Y., a corporation of Delaware Application February 15, 1957, Serial No. 640,479

2 Claims. (Cl. 75—41)

This invention relates to a process of reduction of a metal oxide with carbon monoxide and hydrogen. In one of its more specific aspects, this invention relates to a process for the production of metallic iron or pig iron by the reduction of an iron oxide, particularly iron ore, with carbon monoxide and hydrogen.

In the process of the present invention a reducible metal oxide in lump form is contacted with a mixture of carbon monoxide and hydrogen at a temperature sufficient to cause reduction of the metal oxide to metal and fusion of the resulting metal. The reduction of the solid metal oxide to molten metal takes place in a reduction furnace in which a downwardly moving bed of the metal oxide is maintained. The metal oxide is charged to the top of the bed and the molten metal drawn from the bottom. A reducing gas is introduced near the bottom of the bed and passed upward countercurrent to the flow of the metal oxide. The reducing gas is generated from any suitable fuel by reaction with oxygen, particularly, oil shale, coke and any of the various grades of coal, including lignite, anthracite and bituminous coal.

The present invention is particularly suited to the production of pig iron from iron ore. In the production of pig iron in a conventional blast furnace, coke and fluxing agents, generally limestone, are added to the furnace with the ore. Air is introduced at the base of the blast furnace, to consume the coke and generate carbon monoxide which, in turn, reduces the ore. The process of the present invention differs from conventional blast furnace operations in that at least a portion of the reducing gas required in the furnace is generated in a separate gas generator; in many cases it is desirable to generate all of the reducing gases in the gas generator.

By the process of the invention, part or all of the coke required for conventional blast furnace operations may be eliminated. This represents a tremendous practical advantage, as a number of sources of high grade iron ore are situated at a great distance from a source of coking coal. The production of pig iron may now be made independent of coking coals.

A number of processes for the generation of carbon monoxide and hydrogen from various fuels are known. In the process of this invention the carbon monoxide and hydrogen are generated by partial combustion of a solid carbonaceous fuel with an oxygen-containing gas. While air may be used as the oxygen-containing gas, relatively pure oxygen is preferred. Steam is preferably used in combination with the oxygen for all of the fuels except gaseous hydrocarbons. The reducing gas generator is operated at a temperature within the range of from about 2,000° F. to about 3,000° F., preferably at a temperature above about 2,200° F. and sufficient to insure that the metal and slag are in molten form. In the production of pig iron, a reducing gas temperature of about 2,400° F. is about the minimum temperature required when all of the reducing gas is generated outside the ore reduction furnace.

A flow-type gas generator is preferably used for the generation of reducing gas for the process of this invention. The flow-type generator is characterized by the reaction of the fuel with an oxygen-containing gas in an unpacked reactor. When solid fuel is used, the fuel particles are suspended in the gaseous reactants and the gasification reaction takes place with the solid particles suspended in reactants and gaseous reaction products. For most successful operation of a generator of this type for the production of carbon monoxide and hydrogen, the temperature throughout the generator must be maintained at a temperature above about 2,000° F. The temperature may be as high at 3,000° F., although generally it is undesirable to maintain the temperature at this level because most refractory lining materials rapidly deteriorate at temperatures of 3,000° F. and above. Practical considerations, particularly apparatus limitations, usually limit the operation temperature to 2,600° F. to 2,800° F.

Suitable metal oxides which may be treated in this process include the oxides of iron, copper, vanadium, nickel, chromium, manganese and titanium.

In accordance with a specific embodiment of the present invention, iron oxide is reduced to metallic iron in a cylindrical shaft similar to a conventional blast furnace. Carbon monoxide and hydrogen generated in a separate reducing gas generator by partial combustion of fuel with oxygen is introduced at a temperature above about 2,400° F., into the lower part of the shaft. These gases ascend countercurrent to the descending bed of iron oxide, reducing the iron oxide to molten metallic iron.

Unless pure iron oxide is used, it is generally desirable to add a fluxing agent mixed with the iron oxide to produce a fluid slag at the base of the shaft. A flux is useful to reduce the fusion temperature of the slag and to render it more fluid. Fluxing agents are known in the blast furnace art. Limestone is generally suitable as flux for iron ores, although it may be desirable in some instances, to add fluorspar, silica, alumina, or magnesia to increase the quantity or fluidity of the slag. The kind and amount of flux required may be determined from the composition of iron ore as is known in the blast furnace art. In general, the most satisfactory fusion is obtained when the sum of the lime and magnesia in the feed material is approximately equal in weight to the sum of the alumina and silica. The lime or magnesia may be added in the form of the carbonates, but should be converted to equivalent quantities of the oxide in determining the quantity of flux required.

When a solid fuel is uset in the gas generator, a fluxing material may be added to the gas generator to lower the fusion temperature and insure a molten fluid ash. The requirements for a satisfactory flux may be determined from the composition of the ash, following the foregoing rule for fluxing ore. With most coals, limestone is a satisfactory fluxing material. Generally, it is desirable to discard the slag from the generator; if desired, however, the molten fluid ash from the generator may be discharged directly into the ore reduction shaft together with the hot gases.

The reducing shaft may be operated at atmospheric pressure or at an elevated pressure. An elevated pressure is desirable in that it increases the capacity of the apparatus by speeding up the reactions involved in the reduciton of the metal oxide. The gas generator preferably is operated at an elevated pressure above about 100 p. s. i. g. and preferably at a pressure of at least 100 p. s. i. higher than the pressure in the reducing shaft.

The reduction of the metal oxide may be carried out with carbon monoxide or hydrogen or mixtures of carbon monoxide and hydrogen in almost any desired portion.

It has previously been mentioned that when the metal oxide is an iron oxide or iron ore, it is preferable to operate the furnace at a temperature on the order of 2,500° F. or higher in order that both the iron and slag may be withdrawn in molten form as in conventional blast furnace operations. The temperature at the base of the shaft may sometimes exceed the temperature in the generator. This higher temperature in the shaft may result due to the reaction between the gas and the iron oxide.

In another embodiment of the invention, reducing gas is supplied to a conventional type blast furnace. The blast furnace is charged in the usual manner with iron ore, coke and limestone, but with less than the usual amount of coke. Air, or preferably oxygen, is supplied to the blast furnace in the usual manner, but in less than the usual amount. Since the amount of coke fed to the blast furnace is less than the usual amount, less oxygen is required for reaction with the coke. The deficiency in the quantity of reducing gas resulting from reduction of quantity of coke charged to the furnace is made up by supplying hydrogen and carbon monoxide from a separate gas generator. This operation permits a reduction in the coke requirements for blast furnace operations and permits application of the present invention to existing installations of blast furnaces.

In some instances it may be desirable to charge ceramic pieces, for example, pieces of refractory brick, to the furnace to make up for the omission of coke, to provide support for the charge in the reactor and permit free flow of the gas upwardly through the charge. This has the disadvantage of requiring fusion of the brick or, alternatively, batchwise operation of the furnace.

An object of this invention is to provide an improved process for the reduction of a metal oxide with carbon monoxide and hydrogen. A further object is to provide a process for the production of pig iron from iron oxide wherein the iron oxide is reduced with gas from an external source. A still further object is to provide an improved process for the operation of blast furnaces to reduce the requirements for high grade metallurgical coke. Other objects and advantages of the invention will be apparent from the following detailed description of the invention and the accompanying drawings.

Figure 2:
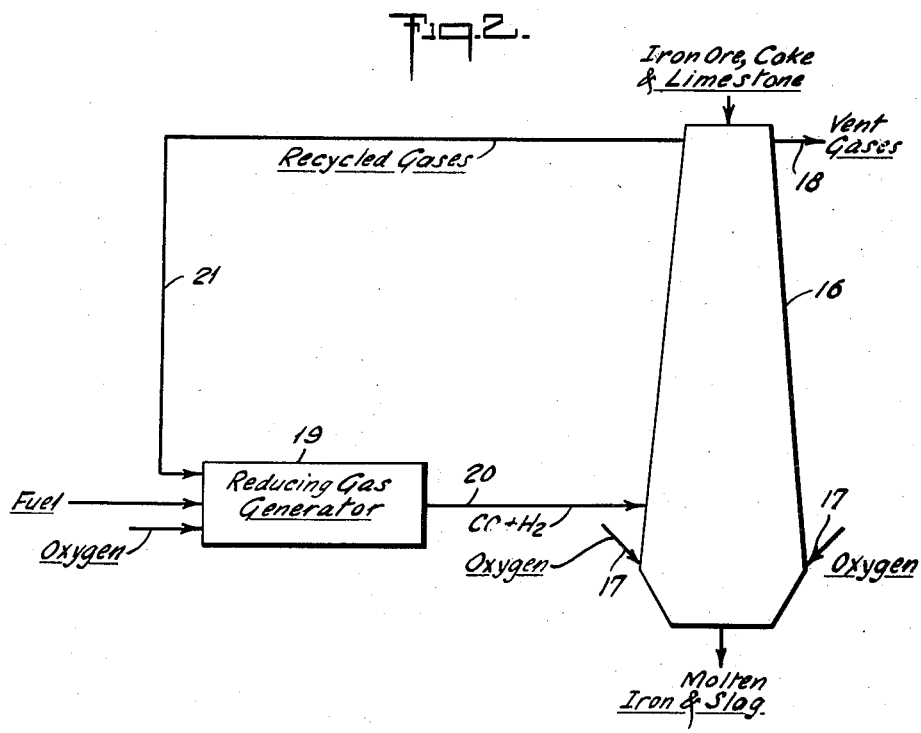

Figure 1 of the drawings illustrates diagrammatically one embodiment of the invention as applied to the production of pig iron from iron ore. Figure 2 illustrates diagrammatically the application of the process of this invention to blast furnace operation.

With reference to the drawing, the numeral 5 designates a shaft filled with iron ore in which the ore is reduced to the molten metal. The ore is preferably reduced in apparatus in the form of a tall vertical column or shaft slightly larger in diameter at the bottom than at the top. Iron ore and limestone are introduced as charge to the upper end of the shaft as indicated in the drawing by lines 6 and 7, respectively. Molten iron and slag are tapped off the bottom of the shaft as indicated by line 8.

Reducing gas is generated in a gas generator 11, in which fuel and oxygen are combined to produce a mixture of carbon monoxide and hydrogen. In this example, the generator is operated at a temperature of about 2,600° F. The resulting stream of hydrogen and carbon monoxide is passed without cooling through line 12, directly into the lower portion of the shaft. The temperature at which the gas generator is operated is preferably the maximum temperature which may be tolerated in the generator without unnecessarily shortening the life of its refractory lining.

As the reducing gas from line 12 passes up through the shaft it is contacted by the iron oxide and limestone slowly descending through the shaft. In the lower portion of the furnace, the iron oxide is substantially completely reduced to metallic iron. Oxygen given up by the iron oxide during its reduction converts the carbon monoxide and hydrogen ascending through the shaft to carbon dioxide and steam. Only a part of the ascending gas stream is oxidized, so that some carbon monoxide and hydrogen is still present in the upper portion of the shaft. Gases are vented from the upper part of the shaft through line 13. These gases contain considerable quantities of heat which may be used for the generation of steam.

Air or oxygen may be introduced into the upper portion of the furnace through line 14, for combustion of the unreacted carbon monoxide and hydrogen. Burning these gases in the upper part of the furnace preheats the incoming charge of iron ore and limestone. It is generally desirable to recirculate gas from an intermediate point in the shaft to the gas generator. This is indicated in the drawings by line 15. The recycle stream may range as high as about 70 percent of the gases ascending through the shaft.

Sulphur may be removed from the reducing gas before it is introduced to the shaft. Sulphur removal may be effected by passing the hot reducing gas stream over iron or limestone. In the process of the invention it is preferable to pass the gas through a bed of limestone, or calcium oxide, for sulphur removal. The calcium oxide may be subsequently charged to the shaft with the ore and the sulphur removed therefrom by burning with the air or oxygen introduced through line 14. Removal of sulphur from the reducing gas is desirable when the fuel supplied to the synthesis gas generator contains an appreciable amount of sulphur, such as, for example, coal, oil shale, sour natural gas, or a sour hydrocarbon oil.

Figure 2 of the drawings illustrates the application of the principles of our invention to the production of pig iron in a conventional blast furnace. A blast furnace 16 is charged with a mixture of iron ore, coke, and a fluxing material, for example, limestone. In accordance with this invention, less than the usual amount of coke is used which, in turn, reduces the limestone requirements. Thus the charge to the furnace is richer in iron ore than is the charge to the conventional blast furnace. Molten iron and slag are tapped from the lower portion of the blast furnace in the usual manner. Air or other oxygen-containing gas, preferably relatively pure oxygen, is introduced to the blast furnace through the usual tuyere 17. Gases are vented from the upper end of the furnace through line 18.

A stream of reducing gas, comprising carbon monoxide, is generated in a reducing gas generator 17 by partial combustion of a carbon-containing fuel with an oxygen-containing gas, preferably relatively pure oxygen. These gases are introduced through line 20 into the blast furnace at an intermediate point, above the point of introduction of air. A part of the gases may be recycled from the upper portion of the blast furnace through line 21 to the reducing gas generator. These gases contain carbon dioxide and water vapor resulting from oxidation of hydrogen and carbon monoxide with oxygen given up by the ore. In the reducing gas generator, the carbon dioxide and water vapor are again converted to carbon monoxide and hydrogen.

It will be evident that, by supplying an auxiliary stream of reducing gas from an external generator to the blast furnace, economies are realized due to the savings of high grade coke. When the limstone charged to the shaft has been previously used for removing sulphur from the gases from the reducing gas generator, the sulphur may be eliminated from the limestone by introducing air or oxygen to the furnace as previously described. This converts the sulphur associated with the limestone or iron ore to sulphur dioxide which is discharged from the shaft with the vent gases.

*Example*

Iron ore containing 63 weight percent iron is reduced in a shaft using a limestone containing about 97 weight percent calcium carbonate as a flux. Ore is charged at the rate of 21.7 tons per hour, mixed with about 3.6 tons per hour of limestone and 7.2 tons per hour of coke. Air is supplied at a rate of 630,000 S. C. F. H. to the blast furnace through tuyeres in a conventional manner. Above the level of the air tuyeres, 6.6 million standard cubic feet per day of reducing gas are introduced into the furnace from a separate gas generator, the operation of which is described more fully hereinafter.

The blast furnace is operated at a pressure of about 40 lbs. per square inch gauge and with a hearth temperature (bottom of shaft) of 2750° F. The furnace produces about 13.8 tons of pig iron per hour containing about 99 weight percent metallic iron and about .01 weight percent sulfur. Molten iron and slag are tapped from the base of the furnace as in conventional blast furnace operations. Hot reducing gas for introduction into the blast furnace as described above is produced in a gas generator of the type described in the co-pending application of Du Bois Eastman and Leon P. Gaucher, Serial No. 490,214, filed February 24, 1955. Ninety-two tons per day of crushed bituminous coal is slurried with 94 tons per day of water. Bituminous coal having the following ultimate analysis is used:

| | |
|---|---|
| Carbon | 77.29 |
| Hydrogen | 4.93 |
| Oxygen | 5.38 |
| Nitrogen | 1.50 |
| Sulfur | 2.59 |
| Ash | 8.31 |

The slurry is pumped through a tubular heating coil wherein it is heated to a temperature of 750° F. In the heating coil the water is vaporized to form a dispersion of coal particles in steam. The dispersion is passed to a cyclone separator wherein 79 tons per day of steam are separated from the steam coal dispersion and discharged from the system for process or heating use. The remaining dispersion of coal in steam is fed into a gas generator operated at 500 p. s. i. g. and at a temperature of 2540° F. Seventy-nine tons per day of oxygen of 95 percent purity preheated to a temperature of 300° F. are reacted with the steam coal dispersion to generate 6.6 million standard cubic feet per day of synthesis gas for the ore reduction step having the following composition:

| | Volume percent |
|---|---|
| Hydrogen | 32.3 |
| Carbon monoxide | 62.1 |
| Carbon dioxide | 1.4 |
| Water | 1.8 |
| Methane | .2 |
| Nitrogen | 1.3 |
| Hydrogen sulfide | .8 |
| Carbonyl sulfide | .1 |

About 12 tons per day of slag comprising unconverted coal and ash are withdrawn from the generator.

Operation of the gas generator at a pressure considerably higher than the pressure in the blast furnace, e. g., 100 to 500 p. s. i. higher than the blast furnace pressure, is an important feature of our invention. The difference in pressure between the gas generator and the blast furnace produces a high velocity jet of reducing gas at its point of introduction to the blast furnace. This insures deep penetration of the blast of reducing gas into the ore bed. A De Laval type nozzle (a convergent-divergent nozzle) may be used to impart maximum velocity to the jet of reducing gas. The velocity of the stream of reducing gas at the point of pressure reduction is preferably in excess of about 1,000 feet per second.

We have found that an auxiliary reducing gas suitable for use in a blast furnace may be produced by partial oxidation of a carbonaceous fuel at a temperature of 2,000 to 3,000° F., preferably at a temperature of 2,400 to 2,800° F. The resulting reducing gas contains from about 2 to about 8 percent steam and from about 1 to 4 percent carbon dioxide by volume. It is preferable to maintain the water content of the reducing gas stream below about 4 percent by volume.

In the method of introducing coal feed to a gas generator by forming a flowable slurry as disclosed herein, it has been found necessary to employ at least 45 weight percent water in the slurry to form a pumpable mixture. Water employed in forming the slurry is a reactant in the gas generation step of our process and only unconverted water appears in the synthesis gas product. We have found that it is necessary to maintain the water content of the feed to the gas generation zone less than about 20 weight percent basis said fuel in order to produce a gas having a water content less than the critical 8 percent by volume noted above. In the above example the feed dispersion passed to the gas generation zone comprises about 14 weight percent water vapor (or about 16 percent basis said fuel) and the gas produced comprises 1.8 volume percent water and 1.4 volume percent carbon dioxide which is well within the preferred range. The formation of a pumpable slurry and the reduction of the water content of the coal steam dispersion formed to produce a product gas from our synthesis gas generator having less than 8 percent water vapor are important features of our process.

This application is a continuation-in-part of our co-pending application Serial No. 416,815, filed March 17, 1954, now U. S. Patent 2,790,711, which in turn in a continuation-in-part of our application Serial No. 264,158, filed December 29, 1951, now abandoned.

Obviously many modifications and variations of the invention, as hereinbefore set forth, may be made without departing from the spirit and scope thereof, and therefore only such limitations should be imposed as are indicated in the appended claims.

We claim:

1. In a process for the reduction of iron oxide to molten metallic iron wherein iron oxide admixed with coke and a fluxing material is contacted in an elongated vertical reduction zone with an upwardly flowing stream of reducing gas comprising carbon monoxide whereby the iron oxide is reduced to molten iron, and oxygen-containing gas is introduced into the lower portion of said reduction zone whereby coke is converted to carbon monoxide, the improvement which comprises forming a pumpable slurry of a solid carbonaceous fuel in water, passing said slurry as a confined stream through an externally heated tubular heating zone wherein substantially all of said water is vaporized from said slurry to form a dispersion of fuel particles in steam, a portion of said steam is separated from said dispersion to maintain the steam content of said dispersion less than about 20 weight percent based upon the weight of said fuel, generating an auxiliary stream of reducing gas comprising carbon monoxide by reaction of said dispersion containing less than about 20 weight percent steam with an oxygen containing gas at a temperature within the range of from about 2,000° F. to about 3,000° F. in a separate gas generation zone, and introducing said auxiliary stream of reducing gas substantially at said reaction temperature directly into said reduction zone at a point above the point of introduction of said oxygen-containing gas to the reduction zone.

2. In a process for the reduction of iron oxide to metallic iron wherein iron oxide is contacted with a reducing gas comprising carbon monoxide in an elongated vertical reduction zone in which the iron oxide is reduced to metallic iron and a portion of the carbon monoxide is converted to carbon dioxide, the improvement which comprises generating reducing gas comprising carbon monoxide by partial combustion of a solid carbonaceous fuel containing sulphur at a temperature in the range of from about 2,000 to about 3,000° F. in a separate gas generation zone whereby the reducing gas is contaminated with a sulphur-containing gas, passing said stream of reducing gas into contact with calcium oxide in a gas treating zone at a temperature in the range of from about 2,000 to about 3,000° F. thereby effecting removal of sulphur from said reducing gas, passing the resulting stream of reducing gas substantially free from sulphur compounds into said reduction zone as a source of reducing gas therein, withdrawing calcium oxide containing sulphur compounds from said gas treating zone, introducing said calcium oxide containing sulphur into the upper portion of said reduction zone together with iron ore, introducing sufficient air into the upper portion of said reduction zone for the combustion of unconverted carbon monoxide and simultaneous conversion of sulphur contained in said calcium oxide to sulphur dioxide, and discharging resulting products of combustion containing said sulphur dioxide from the upper portion of said reduction zone.

References Cited in the file of this patent

UNITED STATES PATENTS

| | | |
|---|---|---|
| 2,702,240 | Rees et al. | Feb. 15, 1955 |
| 2,740,706 | Paull et al. | Apr. 3, 1956 |
| 2,790,711 | Sellers et al. | Apr. 30, 1957 |